United States Patent [19]

Moore et al.

[11] 3,931,619

[45] Jan. 6, 1976

[54] OVERTEMPERATURE MONITOR AND INTEGRATOR APPARATUS

[75] Inventors: Manuel S. Moore; Charles F. Paluka, both of Los Angeles, Calif.

[73] Assignee: Manuel S. Moore, North Hollywood, Calif.

[22] Filed: Dec. 8, 1972

[21] Appl. No.: 313,429

Related U.S. Application Data

[63] Continuation of Ser. No. 71,814, Sept. 14, 1970, abandoned.

[52] U.S. Cl. .......................... 340/228 R; 340/52 R
[51] Int. Cl.² ........................................ G08B 23/00
[58] Field of Search ........ 340/228 R, 227 R, 227 D, 340/231, 52 R, 248 A, 413; 73/35, 339 R

[56] References Cited
UNITED STATES PATENTS

| | | | |
|---|---|---|---|
| 2,901,739 | 8/1959 | Freitas | 340/413 |
| 3,102,425 | 9/1963 | Westman et al. | 340/228 R |
| 3,277,458 | 10/1966 | Greenwood | 340/227 R |
| 3,283,579 | 11/1966 | Josephs | 73/359 |
| 3,341,816 | 9/1967 | Davis et al. | 340/248 A |
| 3,454,787 | 7/1969 | Gelernter | 340/248 A |
| 3,543,582 | 12/1970 | Sessler | 73/339 |
| 3,636,540 | 1/1972 | Harris | 340/228 R |
| 3,688,295 | 8/1972 | Tsoras et al. | 340/228 R |

*Primary Examiner*—Glen R. Swann, III

[57] ABSTRACT

Temperature is sensed in equipment where life is reduced by overtemperature. The sensed temperature is compared to a set point and an output indication showing overtemperature operation is provided to the equipment operator. In addition, a signal is produced which is proportional to the sensed temperature above a reference or threshold value. This signal is passed through a coulomb meter which indicates the total charge. This charge is an integration of the product of the time of duration and the amount of overtemperature, for indicating the accumulated thermal stesses.

8 Claims, 4 Drawing Figures

MANUEL S. MOORE
CHARLES F. PALUKA
INVENTORS

BY Allan M. Shapiro
ATTORNEY

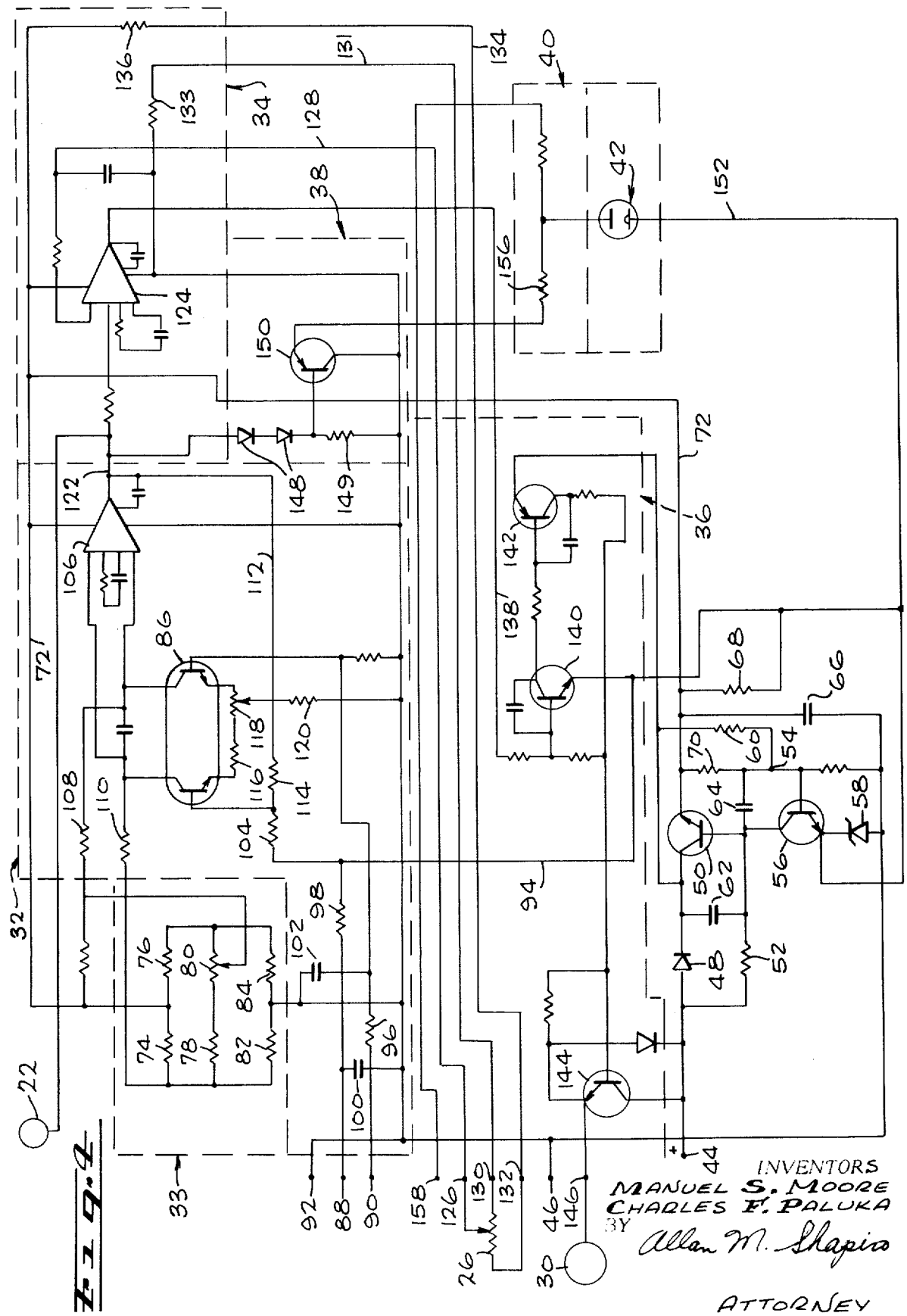

OVERTEMPERATURE MONITOR AND INTEGRATOR APPARATUS

This is a continuation, of application Ser. No. 71,814, filed Sept. 14, 1970, now abandoned.

BACKGROUND OF THE INVENTION

This invention is directed to an overtemperature monitor and integrator apparatus for determining the amount of overtemperature to which a gas turbine or other temperature sensitive equipment is subjected. It has a temperature sensor and an indicator which shows the integrated product of overtemperature and time. Signal processing is accomplished electronically.

The life of many types of prime movers, such as gas turbines, is determined by the duration and excursion of the temperature value above a predetermined base reference temperature. The predetermined base reference temperature is selected as the maximum temperature at which the device can be operated without temperature being substantially detrimental to life. It has been empirically found that the reduction in life duration is approximately a proportional function of the integrated product of time of overtemperature and the amount of overtemperature above this base temperature value.

In order to accommodate for those situations in which engines are thermally overstressed, resulting from overtemperature operation, actual overhaul intervals have been set somewhat arbitrarily on the short side. When the integrated product of overtemperature and time are recorded for the operation of a particular turbine engine, as by practice of the present invention, overhaul decisions are facilitated. When the accumulated date is made accessible during minor overhauls, engine reliability can be improved by being able to pinpoint abused engines, while the periods between major overhauls on well-treated engines may be extended, with the attendant economic benefits.

SUMMARY OF THE INVENTION

In order to aid in the understanding of this invention, it can be stated in essentially summary form that it is directed to an overtemperature monitor and integrator apparatus. The apparatus senses temperature, compares it to an internal set value of normal temperature, and integrates the product of time and this value of excess temperature. Thus, the apparatus includes temperature sensing means, temperature signal data processing, including comparison of the sensed temperature with a preset temperature, and output signal means for displaying the integrated value of the product of excess temperature and time.

Accordingly, it is an object of this invention to provide an overtemperature monitor and integrator apparatus, which has an output display of the integrated product of excess temperature and time. It is a further object of this invention to provide a monitoring device which monitors a prime mover such as a gas turbine and has an indicator output corresponding to overtemperature conditions to which the gas turbine engine has been subjected. The invention is also applicable to bearing temperature measurements on anything; i.e., ship, nuclear powered reactor, etc.

It is a further object to provide a temperature sensor which can be installed in a gas turbine and take temperature data therefrom and provide temperature data processing means whereby the sensed temperature is compared with a preset standard temperature to result in an electrical output signal and have an integrated time/temperature display such as a coulomb meter which integrates the excess temperature with respect to time.

It is a further object to provide an overtemperature monitor which has a display for the engine operator and an integrator apparatus which has an integrated temperature display for the engine mechanic.

It is still another object to provide an apparatus wherein data processing is electronic so that a minimum of equipment weight and a maximum of indicated output reliability is accomplished.

The features of the present invention which are believed to be novel are set forth with particularity in the appended claims. The present invention, both as to its organization and manner of operation, together with further objects and advantages thereof, may be best understood by reference to the following description, taken in connection with the accompanying drawings.

BRIEF DESCRIPTION OF THE DRAWINGS

FIG. 4 is a schematic circuit diagram showing electronic portions of apparatus in accordance with this invention.

DESCRIPTION OF THE PREFERRED EMBODIMENT

Figure 1:
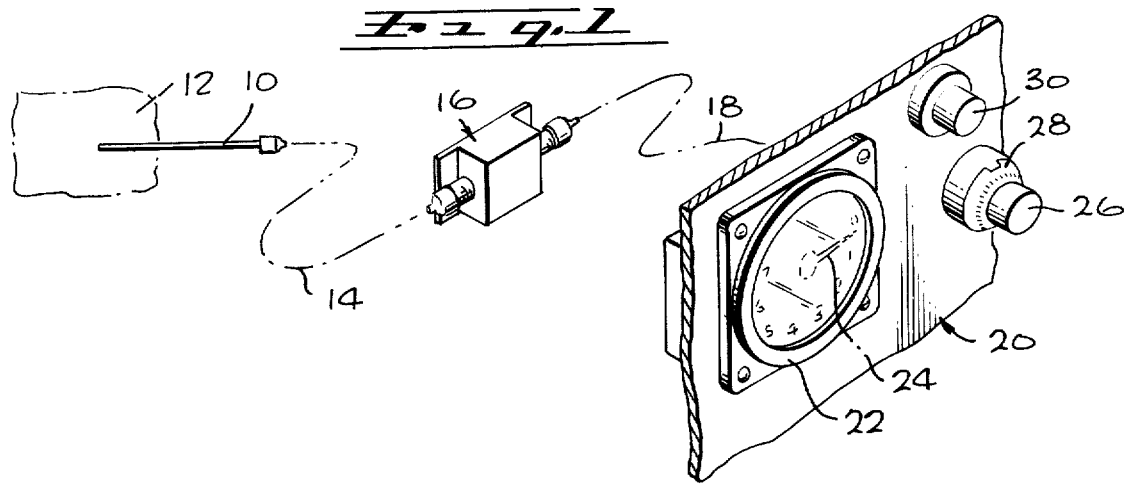
FIG. 1 is a perspective view, partly schematic and partly with parts broken away, showing the overtemperature monitor and integrator apparatus of this invention.
Figure 2:
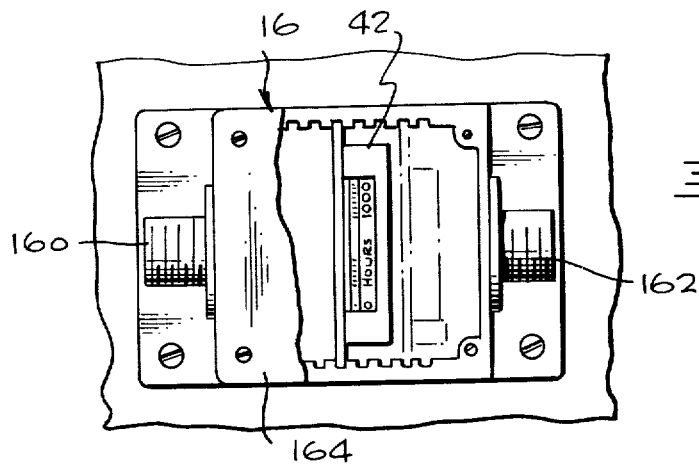
FIG. 2 is a front elevational view, with parts broken away, of the housing for the electronic equipment and for the integrating display forming part of the apparatus.

FIGS. 1 and 2 illustrate the physical arrangement of the various parts of the overtemperature monitor and integrator apparatus. A temperature sensor, such as a thermocouple or a resistance thermometer, is indicated at 10. It is shown as sensing temperature of a device 12 which, in accordance with the preferred employment of this invention, is a thermally active portion of a turbine engine, the temperature of which is related to the temperature of a temperature sensitive portion. The temperature sensor 10 is connected by means of a conventional connecting cable 14 to housing 16 in which is located the electronics and the integrator. Connecting cable 18 is connected from housing 16 to the instrumentation on the turbine engine operator's display panel 20. Furthermore, connecting cable 18 can carry the power supply connections for supplying standard power values to the electronic circuit within housing 16.

Display panel 20 may carry a temperature indicator and display device 22 which has an indicator hand 24 thereon. Indicator hand 24 indicates the actual sensed temperature to the engine operator in "real time"; i.e., as it occurs.

A temperature set point may be internally set to a fixed value or may be operator-controlled by means of manual setting device 26, which is preferably in the nature of a potentiometer. Setting device 26 has a set point indicator 28 which indicates to the operator the reference or set point he has selected. Setting device 26 and set point indicator 28 can be a conventional 10- turn potentiometer with digital readout. An indicator light 30 is also mounted upon display panel 20 and is preferably of the push-to-test type so that the state of the lamp can be determined. Indicator light 30 is arranged so that it is illuminated when the sensed temperature exceeds that set point reference temperature selected by the engine operator by his setting of setting device 26. Thus, in addition to visual display by device 22 of the actual instantaneous operating temperature, light 30 provides visual warning when such temperature exceeds a preset value.

Figure 3:
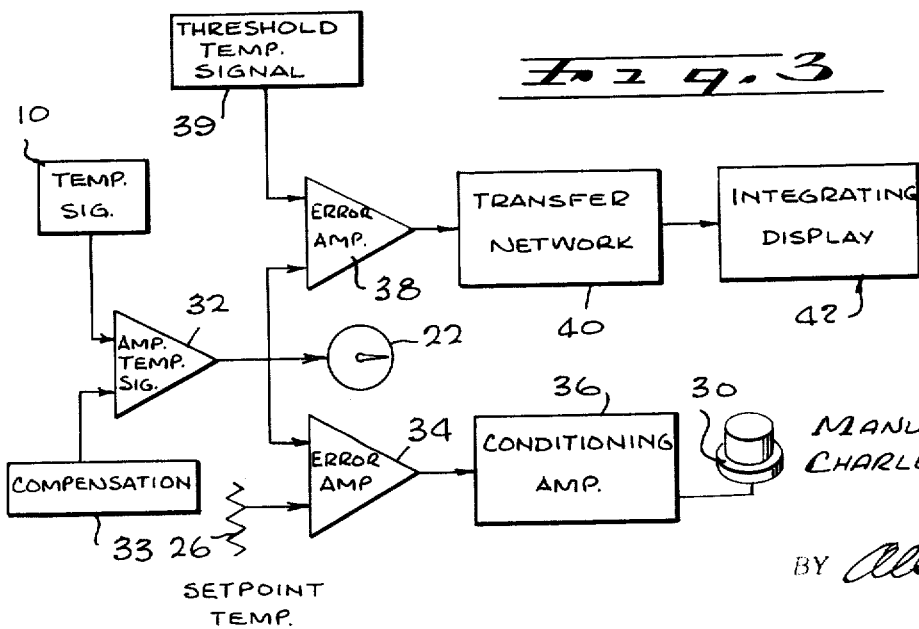
FIG. 3 is a schematic functional diagram of the apparatus in accordance with this invention.

Referring to FIG. 3, the functional interrelationship of the indicator and the electric circuitry in association therewith is indicated. Amplifier 32 has a temperature signal input from thermocouple 10 and a compensation input at 33. Cold junction compensation is desirable to provide an absolute temperature measurement, since the output of a thermocouple is a function of the temperature difference between its hot and cold junctions. Thus, a cold junction temperature compensation circuit 33 is employed as an input to amplifier 32. The output of amplifier 32 corresponds to the absolute temperature of the device sensed thereby making the unit operable within a range of −65° F to +250° F. In such instances, where a coulomb type meter is employed, it may be remotely located to overcome its temperature limitations. There are three parallel systems which employ this temperature signal. The signal is delivered to temperature indicator 22. Error amplifier 34 also receives the signal and compares it with a signal analog from set point setting device 26. The error amplifier has an output when the temperature signal exceeds the set point temperature. The error amplifier output goes to conditioning amplifier 36, where the signal is amplified and is delivered to temperature indicator light 30.

The absolute temperature signal from amplifier 32 is also delivered to error amplifier 38. Amplifiers 34 and 38 are described as error amplifiers because they compare the absolute temperature input signal with a value corresponding to a set point or threshold temperature, and thus have a signal output only when the absolute temperature input signal exceeds the comparative temperature signal corresponding to the set point or threshold value. Thus, error amplifier 38 also has a threshold input signal source 39. The output from error amplifier 38 goes through suitable transfer network 40 to an integrating display 42. This transfer network is preferably resistive, but non-linear means could be provided to allow a greater weighting to more severe overtemperature transients.

As discussed above, cold junction compensation is required to provide an absolute temperature measurement, since the output of any thermocouple is a function of the temperature difference between the hot and cold junctions. The cold junction is located in housing 16, so that temperature sensing of the ambient temperature of housing 16 is not necessary to provide the absolute temperature value of the hot junction in temperature sensor 10. The entire circuitry of FIG. 4 is within housing 16, so that temperature compensation can be incorporated therein. Portions of the circuitry in FIG. 4 are outlined by broken-line blocks bearing the same reference numerals employed in FIG. 3 to indicate the corresponding portions.

Referring to FIG. 4, positive voltage is supplied at terminal 44 and negative voltage is supplied at terminal 46. The operating power from terminal 44 passes through diode 48 to the collector of transistor 50. The diode 48 provides reverse voltage protection. Resistor 52 provides forward bias to transistor 50. As the output of transistor 50 rises, the voltage at junction 54 rises until transistor 50 reaches a conduction level at which transistor 56 becomes conductive. This conduction level is set by the base-to-emitter drop of transistor 56 plus the breakdown voltage of zener diode 58. At this point, transistor 56 becomes conductive and begins to shunt the base current to transistor 50, to hold the output voltage constant. Resistor 60 provides compensation for input voltage changes, while capacitors 62 and 64 stabilize the voltage regulator. Capacitor 66 acts as the output filter, while resistor 68 sets the operating threshold of the zener diode 58. Resistor 70 is scaled so that the voltage in regulated voltage output line 72 is twice the value of the voltage at summing point junction 54.

Temperature sensitive resistor 74 is incorporated in a bridge composed of resistor 74, 76, 78, 80, 82 and 84. Line 72 is connected to the bridge between resistors 74 and 76. The output of the bridge is a voltage related to the theoretical thermocouple output. The compensation signal is inserted into the amplifier comprised of matched transistor pair 86 at the left collector thereof and effectively in series with the hot junction thermocouple signal so that the output of the amplifier formed of transistor 86 is a function of absolute temperature. Resistor 80 provides the scaling adjustment for the synthetic junction to match the actual thermocouple signal.

The actual thermocouple signal generated in temperature sensor 10 is developed at the copper wire junctions. The positive thermocouple signal is connected at terminal 88, while the negative signal is connected at terminal 90. Terminal 92 provides the shield for the thermocouple, if desired.

The positive thermocouple lead is connected from terminal 88 through line 94 to the positive side of zener 58 so as thus to be referenced to the reference voltage across the zener diode. The negative signal at terminal 90 is connected to the right base of transistor 86. The right base of double transistor 86 is referenced to the positive thermocouple voltage through resistor 104.

The collectors of both transistors in the matched transistor pair 86 are connected as inputs to operational amplifier 106. Operational amplifiers, such as the one indicated at 106, are off-the-shelf items and are normally furnished as integrated circuit chips. They are presently available from a large number of manufacturers and are well known in the electronic arts. The collector load resistors 108 and 110 are connected to the cold junction compensation bridge to insert the ambient correction signals into the amplifier comprised of matched transistor pair 86. The output of amplifier 106 is connected to line 112 and resistor 114 to the left base in matched transistor pair 86 to serve as negative feedback to stabilize the gain as the ratio of the resistors 114 to 104.

Emitter resistors 116 and 118 are respectively connected to the left and right emitters of the matched transistor pair 86. Potentiometer output line 120 is connected to the negative terminal 46. The resistors 116 and 118 provide the desired offset bias to the matched transistor pair.

Output line 122 contains the temperature signal referenced to a fixed offset as set by resistance 118 which, it will be recognized, corresponds to the threshold temperature signal setting means 39 of FIG. 3. This temperature signal is compared in operational amplifier 124 against the external set point signal received from the manual setting device 26, which is in the form of a potentiometer, as previously indicated. This signal is on the potentiometer arm and is received at terminal 126 and through line 128 to the operational amplifier 124. The ends of this potentiometer are energized from terminals 130 and 132, which are respectively connected through line 131 and resistor 133 to the negative terminal 46 and through line 134 and resistor 136 to controlled voltage line 72. Thus, the potentiometer is energized by and its signal is returned to operational amplifier 124.

When the sensed temperature, as indicated by a signal in line 122, exceeds the indicated temperature set on manual setting device 26, the output of operational amplififer 124, through line 138 connected to the base of transistor 140, turns on transistor 140, enabling transistor 142 to drive transistor 144. Output terminal 146 is connected to the emitter of transistor 144 and serves to produce the output signal which causes the illumination of light 30.

The output line 122 of operational amplifier 106 is connected through a pair of diodes 148 and resistor 150 to the negative power line connected to terminal 46. The base of transistor 150 is connected between the second diode 148 and resistor 149 so that base drive of said transistor is a function of the voltage in output line 122 which, in turn, is related to the excursion of the sensed temperature above a reference determined by the setting of the potentiometer arm on resistor 118. Diodes 148 provide temperature compensation for transistor 150 over the ambient temperature range.

Emitter drive for transistor 150 comes through line 152 to coulomb meter 42 and thence through emitter resistor 156 to the emitter of transistor 150. The collector of that transistor is connected to the negative power line. Thus, the voltage is supplied by zener 58, but emitter voltage degradation is provided by resistor 156 so that the current flow through coulomb meter 42 is a function of the sensed temperature excursion above the preset level. The integrating nature of coulomb meter 42 causes the displayed value to advance as the product of current and time. Thus, the indicated value on the coulomb meter 42 is an integration of the product of time and overtemperature. Terminal 158 is provided to permit the passage of resetting current through coulomb meter 42 so that it can be reset to zero after turbine maintenance has been performed.

Referring again to FIG. 2, the housing 16 is shown as having connectors 160 and 162. These are the connectors in which the terminals are positioned, so that the terminals can make connects to suitable outside sources. The circuitry of FIG. 4 can be provided upon printed circuit boards positioned in the slots indicated in the housing 16. Coulomb meter 42 is indicated as being secured to a board located in these slots (or may be remotely located for operating in extreme temperature environments, or for convenience of observation of the recorded signal) and, thus, is an integral part of the apparatus. The coulomb meter 42 is not seen, except by careful inspection of the equipment, including removal of cover 164. Thus, it is free of molestation, because only the mechanic who is inspecting the engine control equipment normally sees the indicating meter 42.

Thus, it will be appreciated that the present invention provides means for integrating and displaying the product of the amount and the time of duration of an overtemperature condition in an overtemperature-degraded engine, while simultaneously displaying the instantaneous temperature and indicating the occurrence of a second and different overtemperature condition.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An overtemperature monitor and integrator apparatus for monitoring overtemperature and integrating overtemperature and time in a thermally powered engine comprising:

sensing means for mounting in a thermally powered engine for sensing the temperature of a thermally powered engine and for producing a first electrical signal related in value to the sensed temperature;

signal generator means for producing a second electrical signal related in value to a threshold temperature;

comparator means coupled to said sensing means and said signal generator means for comparing the first and second electrical signals and for producing an output signal only when the first electrical signal indicates a sensed temperature exceeding the threshold temperature, and for producing an output signal related in value to that temperature excess to comprise a temperature excess signal; and means for integrating the product of the value of the temperature excess signal and time and for displaying such product whereby to display the thermal stress or damage on such engine.

2. The apparatus of claim 1 wherein said last mentioned means comprises a coulomb meter connected so that said temperature excess signal passes therethrough so that the product of time and said temperature excess signal is integrated by the coulomb meter.

3. The apparatus of claim 1 and further comprising: transfer network means for receiving the output signal from said comparator means and having the output thereof connected to the input of said last mentioned means.

4. An overtemperature monitor and integrator apparatus for monitoring overtemperature and integrating overtemperature and time in a thermally powered engine comprising:

sensing means for mounting in a thermally powered engine for sensing the temperature of a thermally powered engine and for producing a first electrical signal corresponding in value to the sensed temperature;

signal generating means for producing a second electrical signal corresponding in value to a threshold temperature;

comparator means coupled to said sensing means and said signal generator means for receiving and comparing the first and second electrical signals and for producing an output signal only when the first electrical signal indicates a sensed temperature exceeding the threshold temperature and for producing a first output signal corresponding in value to the amount of sensed temperature excess over the threhold temperature to comprise a temperature excess signal;

means for integrating the product of the temperature excess signal and time and for displaying a representation of such product so that inspection indicates the thermal stress or damage on such engine;

set point means for producing a set point signal corresponding in value to a predetermined temperature;

a second comparator means coupled to said sensing means and said set point means for receiving and comparing the first electrical signal corresponding in value to the sensed temperature with the set point signal and for producing a second output signal corresponding in value to the excess of the sensed temperature signal over the set point signal; and an excess temperature indicator means connected to the output of said second comparator means for indicating the instantaneous occurrence of an engine temperature exceeding the predetermined set point temperature.

5. The apparatus of claim 4 wherein each said comparator means comprises an error amplifier.

6. The apparatus of claim 5 wherein said integrating and display means comprises a coulomb meter connected so that said temperature excess signal passes therethrough so that the product of time and said temperature excess signal is integrated by the coulomb meter.

7. The apparatus of claim 6 wherein:
said sensing means comprises a thermocouple; and
said apparatus includes an electrical bridge coupled to said thermocouple and to at least one of said comparator means, said bridge including a temperature sensitive element so that said bridge provides ambient temperature compensation for the cold junction of said thermocouple.

8. The apparatus of claim 4, wherein said set point means comprises a selectively variable set point means.

* * * * *